Dec. 14, 1926.
H. S. SHAW
WAVE AND TIDE MOTOR
Filed June 27, 1923
1,610,328
2 Sheets-Sheet 2
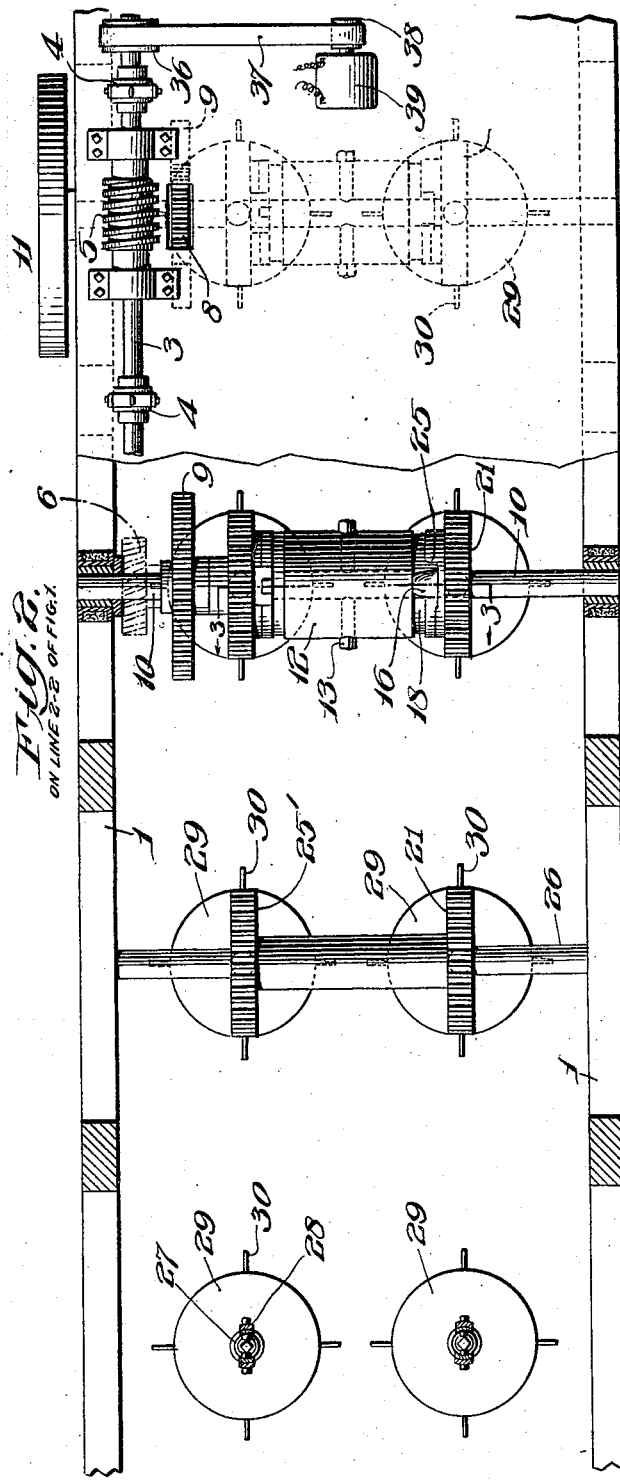
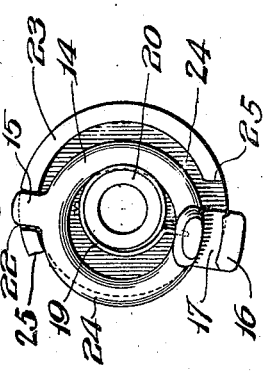
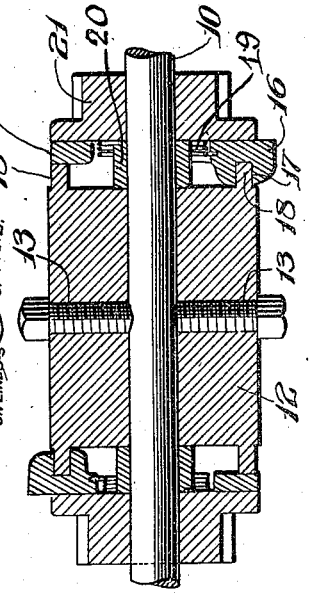
INVENTOR:
Harry S. Shaw.
BY
ATTORNEYS.

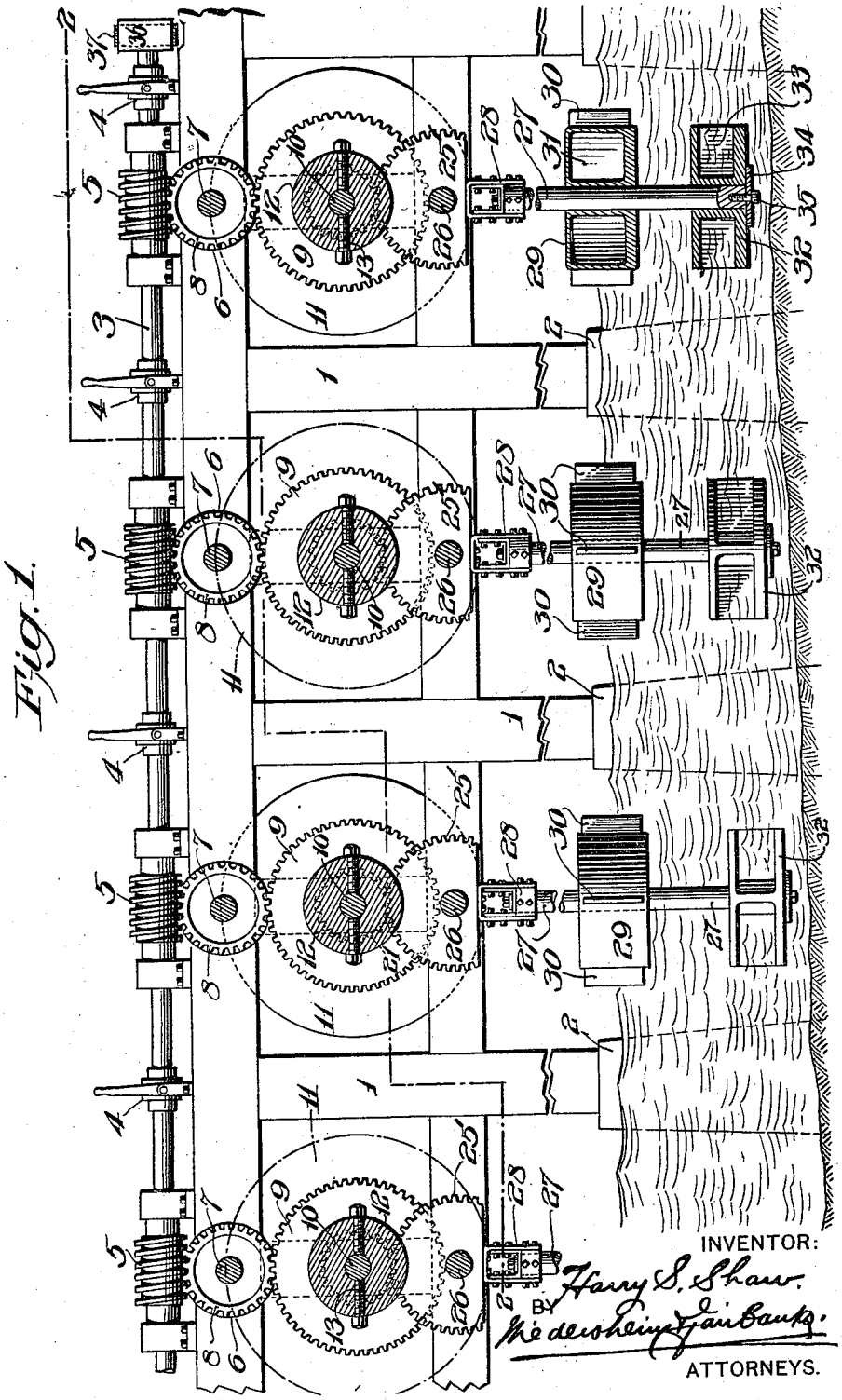

Patented Dec. 14, 1926.

1,610,328

UNITED STATES PATENT OFFICE.

HARRY S. SHAW, OF ATLANTIC CITY, NEW JERSEY.

WAVE AND TIDE MOTOR.

Application filed June 27, 1923. Serial No. 647,977.

My present invention comprehends a novel construction and arrangement of a wave and tide motor by the use of which the energy produced by the waves and tide can be utilized to do useful work.

It further comprehends a novel construction of a wave motor wherein the paddles are constructed and mounted in a novel manner and are operatively connected with a shaft to effect the drive of said shaft in one direction irrespective of whether the paddles are moving forwardly or rearwardly.

It further comprehends a novel construction of a wave motor wherein a desired number of units are employed, each unit comprising a plurality of rocker shafts having paddles of novel construction loosely mounted thereon, the shafts of each unit being operatively connected with the driven shaft which in turn are operatively connected with a device to be driven.

Other novel features of construction and advantage will clearly hereinafter appear in the detailed description and the appended claims.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in sectional elevation, a wave and tide motor, embodying my invention.

Figure 2 represents a section on line 2—2 of Figure 1.

Figure 3 represents a section on line 3—3 of Figure 2.

Figure 4 represents an end elevation of parts shown in Figure 3.

Similar numerals of reference indicate corresponding parts.

Referring to the drawings:

1 designates a supporting framework of any desired character and which in practice is preferably connected with or forms a part of a pier or wharf and is provided with the foundation portions 2 extending to the shore or waterway so that the supporting framework will be rigidly supported. 3 designates a driven shaft which is provided with a series of manually actuated couplings or clutch members 4 so that each individual unit of the wave motor may be cut out, if desired. The shaft 3 is provided with the worms 5 with which mesh the worm gears 6, see Figure 2, said worm gears being carried by the shafts 7 on which are also mounted the gears 8 which mesh with the gears 9 fixed to the shafts 10. The shafts 10 are each preferably provided with a fly wheel 11. The shafts 10 have mounted on them a collar 12 which is fixed thereto by means of the fastening device 13. Loosely mounted on each shaft 10 are driving members 14 in the form of annuli having on one side a lug 15 and at its diametrically opposite side a gripping member 16 having a circular slot 17 therein into which extends the annular flange 18 of the collar 12. A spring 19 has one end fixed to a boss or hub, 20 of a gear 21 and its opposite end, as at 22, is connected with the driving member 16, see Figures 3 and 4.

The lug 15 extends into a slot 22 in a flange 23 extending from a disc 24 integral with the hub 20. The flange terminates, as at 25, in order to limit the movement in one direction of the driving member 16. It will be understood that in this manner each unit is connected with the driven shaft 3.

25' designates gear segments loosely mounted on the shafts 26 journalled in the supporting framework and these gear segments mesh with their respective gears 21. Each gear segment has connected to it in any desired manner an oscillating shaft 27 by means of a universal coupling 28. Each shaft 27 has loosely mounted on it, so as to be free to rotate, a float 29 having the paddles 30 on its periphery which are preferably vertically disposed. The float 29 is preferably internally chambered, as indicated at 31. 32 designates a paddle also loosely mounted on its shaft 27 and provided with the radially disposed apertures 33 open to the water so that this paddle will normally be maintained in the position seen in Figure 1 although it, as well as the float 29, is capable of moving upwardly or downwardly as well as being free to rotate on its shaft 27. The downward movement of the paddle 32 is limited by means of a disc 34 which is secured to the shaft 27 by means of a fastening device 35. The driven shaft 3 may be connected in any desired manner with the mechanism to be driven and for purpose of illustration, I have shown this driven shaft 3 as provided with a pulley 36 around which passes a belt 37 which latter also passes around the pulley 38 carried by the shaft of a dynamo 39.

In the operation, it will be understood that a plurality of shafts 27 and their paddles are provided for each wave motor unit. Each shaft 27 actuates its gear segment 25 to effect a drive when moving in one direction and when moving in an opposite direction, it is ineffective to drive. It will be seen that the spring 19 normally maintains the driving member 16 against a lug 24. When the shaft 27 is moving in its operative direction, the gear 21 is partially rotated thereby causing an eccentric movement of the driving member 16 so that the walls of the slot 17 of such driving member will be in frictional engagement with the flange 18 of the collar 12.

This will cause a partial rotation of the shaft 10 and since this shaft 10 is operatively connected with the driven shaft 3 to drive it, a partial rotation of the driven shaft 3 will be effected. On the reverse movement of the shaft 27, which has been driving in the manner just described, the spring 19 will move the driven member 16 into its concentric position with respect to the shaft 10 so that no movement will be imparted to the shaft 10 at such time. At this time, however, the shaft 27 on the opposite side is effected to cause a partial rotation of the driven shaft 3 so that the driven shaft 3 will be continuously revolved.

The movement of each shaft 27 is caused by the action of the wave and tide on the paddles. It will be seen that irrespective of the direction in which this action is exerted, the paddles will impart movement to their shafts 27. The rise and fall of the tide will cause the upper paddle 29 to rise and fall lower and if a side strain comes on the paddle blades 30 this movement will be translated to cause a movement of the shaft 27.

The energy of the water in motion exerted against the side blades 30 of the paddles and also against the walls of the recesses or chambers 33 tends to cause an oscillatory movement of the shaft 27 to which they are connected. It will be apparent that the direct and indirect thrust due to the action of the tide on the paddles also tends to impart a movement to each shaft 27.

Special attention is directed to the novel construction and arrangement of the paddles since they are loosely mounted on their shafts so that they are not likely to be injured during storms, shifting sands or any action which occurs under abnormal conditions. If the sand should enter the recesses in the lower paddles, it will be apparent that since they are free to revolve, they are practically self cleaning and the reciprocatory movement of the paddles tends to prevent the sand collecting in their path and interfering with their operation.

The operative connections between the shaft 27 and the driven shaft 3 are carried by a rigid framework which in practice can be placed if desired at a sufficient height above the water so that they will not be subjected to the deleterious action of the salt or other water. The fly wheels 11 have a tendency to maintain a continuous revolution of the shaft 10.

For the purpose of illustration, I have shown the wave motor as consisting of four driving units but it will be apparent that any desired number of wave motor units may be employed and any desired number of paddles and shafts 27 may be employed as a single unit.

It will now be apparent that I have devised a new and useful wave and tide motor which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In a wave and tide motor, an oscillatory shaft, a shaft operatively connected with said oscillatory shaft to be driven by it, and a paddle slidably and rotatably mounted on said oscillatory shaft, having its top and bottom closed and having apertures between its top and bottom opening through its periphery, said paddle being normally retained at the lower end of said oscillatory shaft.

2. In a wave and tide motor, an oscillatory shaft, a shaft operatively connected with said oscillatory shaft to be driven by it, a paddle slidably and rotatably mounted on said oscillatory shaft, having its top and bottom closed and having apertures between its top and bottom opening through its periphery, and a chamber float slidably and rotatably mounted on said oscillatory shaft to be free to revolve on it above said paddle and having side paddles extending from its periphery.

HARRY S. SHAW.